United States Patent
Yannam et al.

(10) Patent No.: US 10,120,858 B2
(45) Date of Patent: Nov. 6, 2018

(54) QUERY ANALYZER

(71) Applicant: Bank of America Corporation, Charlotte, NC (US)

(72) Inventors: Ramakrishna R. Yannam, Seattle, WA (US); Viju Kothuvatiparambil, Seattle, WA (US); David H. Witting, Puyallup, WA (US); Bharathiraja Krishnamoorthy, Redmond, WA (US); Mahalakshmi Chandra Sekaran, Seattle, WA (US); Sushil Golani, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 368 days.

(21) Appl. No.: 14/947,055

(22) Filed: Nov. 20, 2015

(65) Prior Publication Data

US 2017/0147555 A1 May 25, 2017

(51) Int. Cl.
*G06F 17/30* (2006.01)
*G06F 17/27* (2006.01)
*G06F 3/0482* (2013.01)
*G06F 3/0484* (2013.01)

(52) U.S. Cl.
CPC ......... *G06F 17/274* (2013.01); *G06F 3/0482* (2013.01); *G06F 3/04842* (2013.01); *G06F 17/2785* (2013.01); *G06F 17/30398* (2013.01); *G06F 17/30401* (2013.01); *G06F 17/30554* (2013.01)

(58) Field of Classification Search
CPC ......... G06F 17/30864; G06F 17/30867; G06F 17/30991; G06F 17/30696
USPC ......... 707/722
See application file for complete search history.

(56) References Cited

U.S. PATENT DOCUMENTS

| | | | |
|---|---|---|---|
| 9,245,029 B2 * | 1/2016 | Musgrove | G06F 17/30672 |
| 2012/0303356 A1 * | 11/2012 | Boyle | G06F 17/30672 704/9 |
| 2013/0159340 A1 * | 6/2013 | Blanco | G06F 17/30867 707/769 |
| 2014/0074826 A1 * | 3/2014 | Cooper | G06F 17/30672 707/722 |

(Continued)

*Primary Examiner* — Michael Pham
(74) *Attorney, Agent, or Firm* — Weiss & Arons LLP; Michael A. Springs, Esq.

(57) ABSTRACT

Methods for analyzing a query is provided. Methods may include receiving a query from a user. Methods may include dissecting the query into a plurality of word segments. Methods may include determining, based on a predetermined ontology, which of the plurality of words satisfies a predetermined ontological threshold and which words do not satisfy the predetermined ontological threshold. Methods may include discarding the words that do not satisfy the predetermined ontological threshold. Methods may include determining a part of speech associated with each word based on the content of the query. Methods may include determining a concept associated with each word based on the content of the query. Methods may include displaying to the user word that satisfies the predetermined threshold alongside the associated part of speech and associated concept. Methods may include enabling the user to change each word, each concept and each part of speech.

18 Claims, 9 Drawing Sheets

(56) References Cited

U.S. PATENT DOCUMENTS

2014/0114902 A1\* 4/2014 McClung .............. G06N 5/025
706/50

\* cited by examiner

| QUERY | Receiver Module | Disjunction Module | | | | | | Presentation Module | Re-Entry Module |
|---|---|---|---|---|---|---|---|---|---|
| | | Identifier Module | Determination Module | Discarding Module | Part of Speech Assignment Module | Concept Assignment Module | | Concept Display Module | |
| I want to order checks | Receives "I want to order checks" | 1. I<br>2. want<br>3. to<br>4. order<br>5. checks | 1. I 50%<br>2. want 60%<br>3. to 35%<br>4. order 70%<br>5. checks 85% | 1. I<br>2. want<br>3. to<br>4. order<br>5. checks | 2. want VB<br>4. order VB<br>5. checks N | 2. want Requisition<br>4. order Requisition<br>5. checks Written order to direct bank to pay money | | Display<br>want VB Requisition<br>order VB Requisition<br>check N Written order to direct bank to pay money | Enables a user to modify the concept and/or part of speech associated with the query |

FIG. 9

QUERY ANALYZER

FIELD OF TECHNOLOGY

This invention relates to queries. More specifically, this invention relates to analyzing queries.

BACKGROUND OF THE DISCLOSURE

Many web pages include search entry boxes. The search entry boxes accept queries pertaining to the web pages or information found on the web pages. A user may enter a query into a search entry box. The web page may present the user a list of possible answers to the query.

Under certain circumstances, none of the presented answers provide assistance to the user. The answers may not provide assistance to the user for a number of reasons. One reason may be that the user presented the query with poor sentence structure, and therefore the underlying system misconstrued the query. Another reason may be that the words within the query were misspelled. Yet another reason may be that the underlying system misinterpreted a word in the query. For example, the system interpreted the word "check" to mean "a written order directing a bank to pay money", while the user intended the word "check" to denote "a direct attack on an opponent's king in a game of chess".

A user, viewing a list of useless query answers, may not know what to do in order to improve his or her query. Therefore, the user may become frustrated, and frequent the website less. A reduction in the amount of website visits may be detrimental for an entity.

Therefore, a need exists for a query analyzer and repair appliance. It would be desirable for a query analyzer and repair appliance to present a received query to a user. It would further be desirable for the query analyzer and repair appliance to dissect the query and present to the user an explanation of the dissected query in order for the user to repair or refine his or her query.

SUMMARY OF THE DISCLOSURE

A query analyzer is provided. The query analyzer may include a receiver module. The receiver module may receive a query from a user.

The query analyzer may also include a disjunction module. The disjunction module may separate the components of the query. The disjunction module may include an identifier module. The identifier module may identify each word in the query.

The disjunction module may also include a determination module. The determination module may determine whether each word satisfies a predetermined ontological threshold, or does not satisfy the predetermined ontological threshold. The predetermined ontological threshold may be a threshold for determining whether a word is critical to understanding the meaning of a sentence, or whether a word is required merely for sentence structure. The determination may be based on a predetermined ontology. The predetermined ontology may be entity-specific. The predetermined ontology may be LOB—(line of business) specific.

The disjunction module may also include a discarding module. The discarding module may discard each word that does not satisfy the predetermined ontological threshold.

The disjunction module may also include a part of speech assignment module. The part of speech assignment module may assign a part of speech to each word that satisfies the predetermined ontological threshold.

The disjunction module may also include a concept assignment module. The concept assignment module may assign a concept to each word that satisfies the predetermined ontological threshold.

The query analyzer may also include a presentation module. The presentation module may present results to the user. The results may include each word, each part of speech and each concept. The presentation module may include a display. The display may display to the user each word that satisfies the predetermined ontological threshold. The display may also display to the user each part of speech that may correspond to each word that satisfies the predetermined ontological threshold. The display may also display to the user each concept that may correspond to each word that satisfies the predetermined ontological threshold.

The query analyzer may also include a re-entry appliance. The re-entry appliance may enable the user to modify the query. The re-entry appliance may include a first drop-down menu. A top-most portion of the first drop-down menu may be adjacent to the display of each word that satisfies the predetermined threshold. Each drop-down menu may include a predetermined list of words. The predetermined list of words may relate to the word to which it is adjacent. The first drop-down menu may enable a user to select from the predetermined list of words. In response to the user selecting a word from the predetermined list, the selected word may replace the word which was originally part of the query.

The re-entry appliance may also include a second drop-down menu. A top-most portion of the second drop-down menu may also be adjacent to the display of each word that satisfies a predetermined threshold. Each second drop-down menu may include a predetermined list of parts of speech. The predetermined list of parts of speech may relate to the word that satisfies the predetermined threshold. The query analyzer may indicate a selection of one of the parts of speech. The query analyzer may have associated the word with the selected part of speech. The user may be enabled to select a part of speech other than the selected part of speech, from the predetermined list. Upon selection, by a user, of a different part of speech, the query analyzer may place a visual indication on the selected part of speech.

The re-entry appliance may also include a third drop-down menu. A top-most portion of the third drop-down menu may be adjacent to the display of each word that satisfies the predetermined threshold. Each third drop-down menu may include a predetermined list of concepts. The predetermined list of concepts may relate to the word to which it is adjacent. The query analyzer may indicate the associated concept on the predetermined list. The query analyzer may enable the user to select a concept other than the selected part of speech. Upon selection, by a user, of a different concept than the indicated concept, the query analyzer may place a visual indication on the selected concept.

The indication may be highlighting of the text of the concept/part of speech/word, color change of the text of the associated concept/part of speech/word, shading behind the text of the associated concept/part of speech/word, a bullet point adjacent to the text of the associated concept/part of speech/word, moving the selected concept/part of speech/word to a top-most position on the drop-down list and any/or other suitable indication.

Upon changing an indication on the drop-down menus, a user may be presented with an option for the underlying system to present updated answers to the updated query. The answers presented to the user after the user has adjusted the query may include more relevant results than those provided by the initial query.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

A query analyzer and query repair appliance is provided. A method for analyzing queries is also provided. The method may include receiving a query from a user. A user may transmit a query via a search entry box on a webpage. A user may transmit a query via a chat box on a webpage. A user may transmit a query via text messaging. A user may type a query into a text entry field and depress an analyze query button. A user may type a query into a text entry field, receive query results from the webpage, and upon receipt of the results, the user may depress an analyze query button. A user may transmit a query via any other transmittal means.

The method may dissect the query into a plurality of word segments. The method may parse the incoming query string using a "string tokenizer". The method may also parse the incoming query by separating the sentence into an array using white space as a separator. The method may also parse the incoming query using any other suitable method for dissecting a sentence. The output of the dissecting method may be a plurality of words. The plurality of words may be stored in an array, a heap, or any other suitable data structure.

The method may also include determining which of the plurality of words satisfies a predetermined ontological threshold. The predetermined ontological threshold may be a threshold for determining whether a word is critical to understanding the meaning of a sentence, or whether a word is required merely for sentence structure. Each word may be ranked on a scale of 1-100, or any other suitable scale. A word with a lower ontological rank may be less important than a word with a higher ontological rank. For example, words such as "the", "a", "an", etc. may rank lower than words such as "check", "deposit", "memory", etc.

The determining may be based on a predetermined ontology. The predetermined ontology may include a library of words. The predetermined ontology may also include an appropriate ranking for each word. The predetermined ontology may also be entity specific. For example, a plumbing entity may rank the word "pipe" with a relatively high score, while a financial entity may rank the same word "pipe" with a relatively low score. The word "pipe" may be significant in the plumbing industry, but may be insignificant, or have little significance, in the financial industry.

The method may include discarding the words that do not satisfy the predetermined ontological threshold. The discarding may conserve computer resources which would have been allocated to words and/or analyzing of words that have been deemed insignificant in the process of deciphering the query.

The method may include determining a part of speech associated with each word that satisfies the predetermined ontological threshold. The part of speech determination may be determined based on the content of the query. For example, the word "check" may be a verb (Check if the mail arrived.) or a noun (Please mail the check to the insurance company.).

The method may include determining a concept associated with each word that satisfies the predetermined ontological threshold. The concept determination may be determined based on the content of the query. For example, the word "order" may be associated with the concept "requisition" when found in the sentence: "I want to order books". In another example, the word "order" may be associated with the concept "tidiness" when found in the sentence: "Please bring order to this mess."

The method may include displaying each word to the user. In some embodiments, the method may preferably display only words that satisfy the predetermined threshold. The method may also include displaying the determined part of speech associated with each word. The method may also include displaying the determined concept associated with each word. The determined part of speech and the determined concept may be displayed adjacent to the word. The determined part of speech and the determined concept may be displayed adjacent the word, along a horizontal axis extending in a horizontal direction from the location of the word on the display.

The method may include enabling the user to change each word that satisfies the predetermined threshold. The method may include enabling the user to change each concept. The method may also include enabling the user to change each part of speech. Drop-down selection boxes, text entry boxes, radio buttons and any other suitable selection or entry input may be used by the user to modify the words, parts of speech and concepts.

In some embodiments, the enabling may include displaying a predetermined list of words relating to each word that satisfies the predetermined threshold. The list of words may be displayed in a vertical drop-down menu orthogonal to the horizontal axis.

In some embodiments, the enabling may include displaying a predetermined list of parts of speech relating to each word that satisfies the predetermined threshold. The list of parts of speech may be displayed in a vertical drop-down menu orthogonal to the horizontal axis. The list of parts of speech may also be displayed directly vertically under the part of speech. The list of parts of speech may be displayed in a vertical drop-down menu orthogonal to the horizontal axis as well as directly vertically under the part of speech.

In some embodiments, the enabling may include displaying a predetermined list of concepts relating to each word that satisfies the predetermined threshold. The list of concepts may be displayed in a vertical drop-down menu orthogonal to the horizontal axis. The list of concepts may also be displayed directly vertically under the part of speech. The list of concepts may be displayed in a vertical drop-down menu orthogonal to the horizontal axis as well as directly vertically under the concept.

Upon viewing the display of the analyzed query, the user may want to modify his or her query. At times, the user may want to enter an entirely new query. The method may include displaying a text entry field to enable a user to enter a new query. The method may also include a text entry field auto-populated with the user's original query. The auto-population may enable a user to modify the query without requiring the user to re-type the entire query.

In some embodiments, a user enters a group of words and the method retrieves information for each word distinctly. A user may be presented with a tool that will enable the user to identify to the system which words are to be understood in a group and which words should be understood distinctly. The tool may be a highlighter tool which will show the user how the words were analyzed and enable the user to modify the highlighting as necessary.

Also, a user may utilize the query analyzer by analyzing a query in language other than his or her native language. The query analyzer may query the user regarding his or her native language in order to analyze the query based on the grammatical structure common to his or her native language. This may enable a user to enter a query in an incorrect grammatical structure and the query will be analyzed in the correct grammatical structure.

A query analyzer may also include machine-learning algorithms. The machine-learning algorithms may learn a user's natural language. The machine-learning algorithms may review the queries a user entered, the method that was used to analyze the query and the approach the user took to modify the query. The query analyzer may identify certain grammatical tendencies from users entering the query. The machine-learning algorithms may identify the natural language of the user prior to the user entering his or natural language.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

Figure 1:
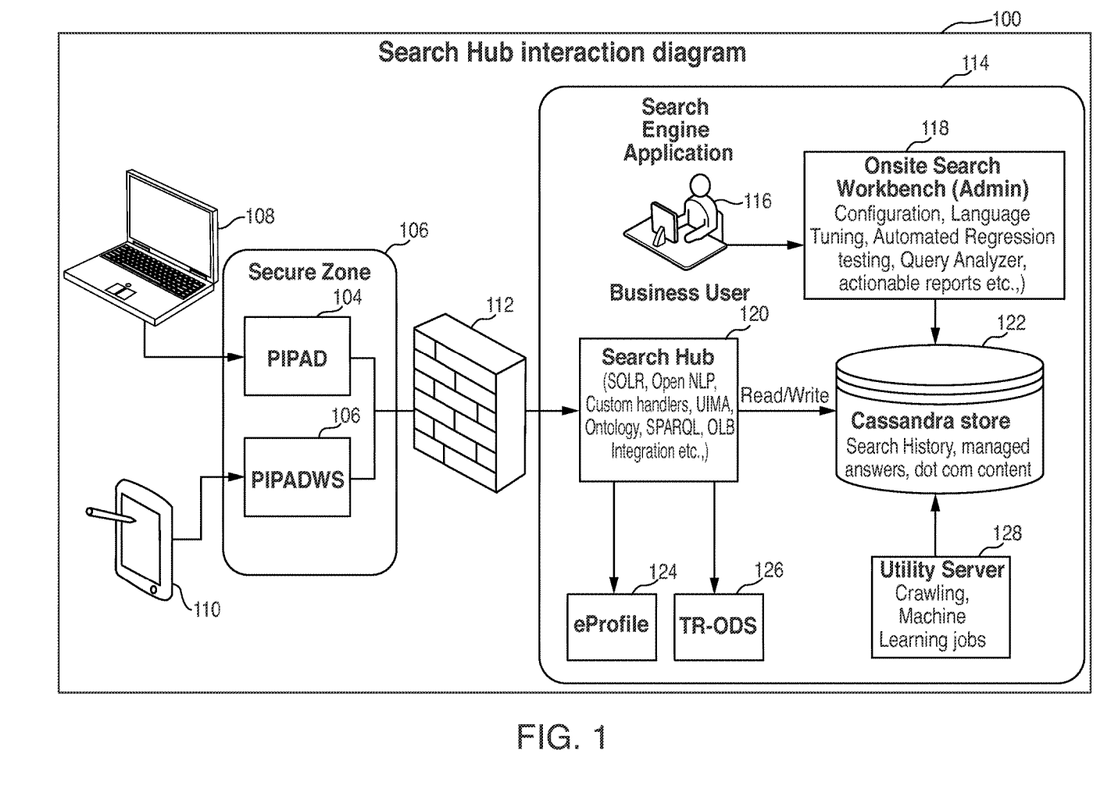
FIG. 1 shows an illustrative hybrid apparatus/flow diagram in accordance with the principles of the invention.

FIG. 1 shows an illustrative hybrid apparatus/flow diagram according to certain embodiments. Search Hub interaction diagram 100 shows initiation of a query at laptop computer 108 and/or tablet computer 110. Initiation of a query may include a letter, a word, a phrase or other information that indicates that the user has expressed interest in obtaining information in response to a preferably user-defined query.

Preferably, the query must first pass through a secure zone 102 prior to traversing firewall 112. Secure zone preferably includes PIPAD 104 for providing a path for query initiation generated by laptop computers 108 and PIPADWS 106 for providing a path for query initiation generated by tablet computers 110.

Upon successful traverse of secure zone 102 and firewall 112, the initiation of the query may enter a search engine application 114.

The search engine application 114 may, in certain embodiments, receive the user's search initiation at search hub 120. Search hub 120 may include a number of open source searching applications.

Certain open source search applications, and other applications, included in search hub 120, and general searching according to the invention, may preferably include applications such as SOLR, Open NLP, UIMA, SPARQL, among others.

SOLR is an open source search application that provides, inter alia, distributed indexing, replication and load-balanced querying, automated failover and recovery as well as centralized configuration.

The most common OpenNLP tasks include tokenization, sentence segmentation, part-of-speech tagging, named entity extraction, chunking, parsing, and coreference resolution. These tasks are usually required to build more advanced text processing services. OpenNLP also includes maximum entropy and perception-based machine learning.

UIMA is the acronym for Unstructured Information Management Applications. These applications are software systems that analyze large volumes of unstructured information in order to discover knowledge that is relevant to an end user. An exemplary UIM application may receive plain text and identify entities, such as persons, places, organizations in response to the received plain text; or relations, such as works-for or located-at.

UIMA enables applications to be decomposed into components, for example "language identification"=>"language specific segmentation"=>"sentence boundary detection"=>"entity detection (person/place names etc.)". Each component implements interfaces defined by the framework and provides self-describing metadata via XML descriptor files. The framework manages these components and the data flow between them. Components are typically written in Java™ or C++; the data that flows between components is designed for efficient mapping between these languages.

UIMA additionally provides capabilities to wrap components as network services, and can scale to very large volumes by replicating processing pipelines over a cluster of networked nodes.

SPARQL, in one aspect, is a query language. SPARQL is "data-oriented" in that it only queries the information held in the models. There is preferably no inference in the query language itself. SPARQL preferably takes the description of what the application wants, in the form of a query, and returns that information. In the particular embodiments described herein, SPARQL may serve to retrieve information in response to a completed and/or potential query.

Other aspects of search hub 120 may include customer ontology, which relates to usage of words as retrieved from historical user queries, among others, custom handlers and Online Banking ("OLB") integration.

Some embodiments enable search hub 120 to access eProfile 124. eProfile 124 may include information relating to the user's accounts, personal information, behavior, prior searches, history and any other stored information that may be relevant to a user. In certain embodiments, such information may be accessible exclusively by search hub 120. In certain embodiments, such information may be accessible by the user. In certain embodiments, such information may be accessible exclusively by business user 116.

Search hub may also be coupled to TR_ODS which is an acronym for transactional operational data store. TR-ODS 126 may be understood to be a type of database that serves as an interim area for a data warehouse in order to store time-sensitive operational data that can be accessed quickly and efficiently. In contrast to a data warehouse, which contains large amounts of static data, an ODS contains small amounts of information that is preferably dynamic and may be updated through the course of business transactions.

In some embodiments, TR-ODS 126 may perform numerous quick and simple queries on small amounts of data, such as acquiring an account balance or finding the status of a customer order, whereas a data warehouse may perform complex queries on large amounts of data. An ODS may contain only current operational data while a data warehouse contains both current and historical data.

In conjunction with utilizing the various search software applications, search hub 120 may read and/or write to Cassandra Store 122. Cassandra 122 is an open source distributed database management system designed to handle large amounts of data across many servers. Cassandra preferably provides high availability with no single point of failure.

Cassandra 122 may include, for example, previous user search history, managed answers and/or broadly-based dot-.com content.

Cassandra 122 may also be coupled to receive input from a business user via an onsite workbench 118 (administered by an entity-local admin.) Such a workbench may preferably enable configuration of the various elements of search engine application 114, language tuning for the elements that relate to ontology, query parsing, auto-complete tuning, automated regression testing, query analysis, actionable reports, use of a query analyzer etc.

Also, Cassandra 122 is preferably coupled to utility server 128. Utility server 128 preferably supports Cassandra 122 by providing web-crawling for certain queries, and adding machine learning where necessary for certain queries.

Figure 2:
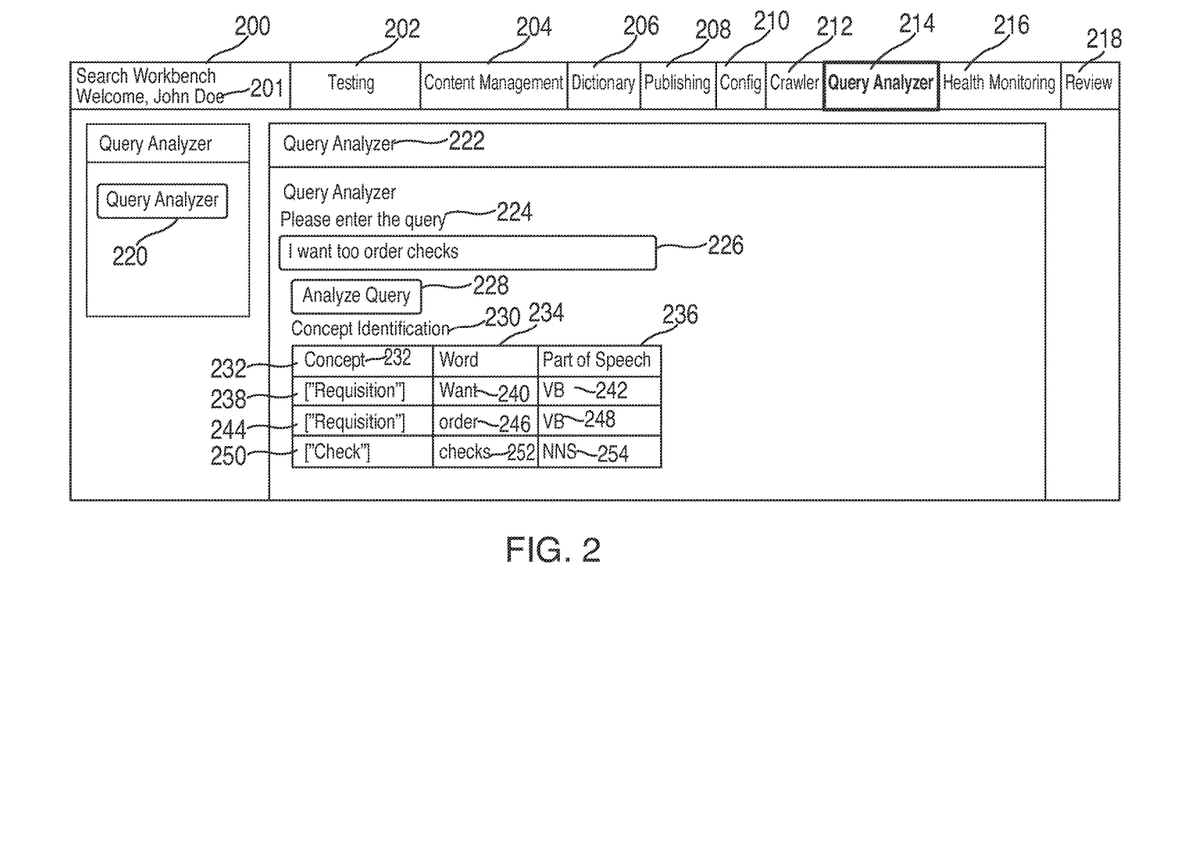
FIG. 2 shows an illustrative graphical user interface ("GUI") in accordance with an embodiment of the invention.

FIG. 2 shows webpage 200. Webpage 200 may include testing tab 202, content management tab 204, dictionary tab 206, publishing tab 208, config. tab 210, crawler tab 212, query analyzer tab 214, health monitoring tab 216, review tab 218 as well as any other suitable tab. Webpage 200 may be open to query analyzer tab 214. Query analyzer 222 may be located on webpage 200. A webpage user may be required to select query analyzer button 220 to open query analyzer 222.

Query analyzer 222 may include "Please enter the query" 224. Beneath "Please enter the query" 224 may be text entry field 226. A user may enter his or her query into text entry field 226. A user may have entered "I want to order checks" into text entry field 226. After entering text into text entry field 226, a user may select analyze query button 228.

Upon selection of analyze query button 228, query analyzer 222 may present concept identification table 230. Concept identification table 230 may include column 230—concept identification, column 234—word, column 236—part of speech as well as any other suitable column.

The words of the query that have met the predetermined ontological threshold may be included in column 324. These words may include "want", as shown at 240, "order", as shown at 246 and "checks" as shown at 252. The word "want" may be associated with the concept "requisition", as shown at 238. The word "want" may also be associated with the part of speech "VB" (verb), as shown at 242. The word "order" may be associated with the concept "requisition", as shown at 244. The word "order" may also be associated with the part of speech "VB" (verb), as shown at 248. The word "checks" may be associated with the concept "check", as shown at 250. The word "checks" may also be associated with the part of speech "NNS" (nouns), as shown at 254.

A user may be enabled to change the part of speech or concept associated with any of the words. For example, a user may intend the word order to be used as a noun. The user may enter the part of speech noun into a part of speech entry field which previously held the part of speech noun. The user may then click a submit query button (not shown). In response to clicking the submit query button, the system may present the user with a list of answers to the updated query.

Figure 3:
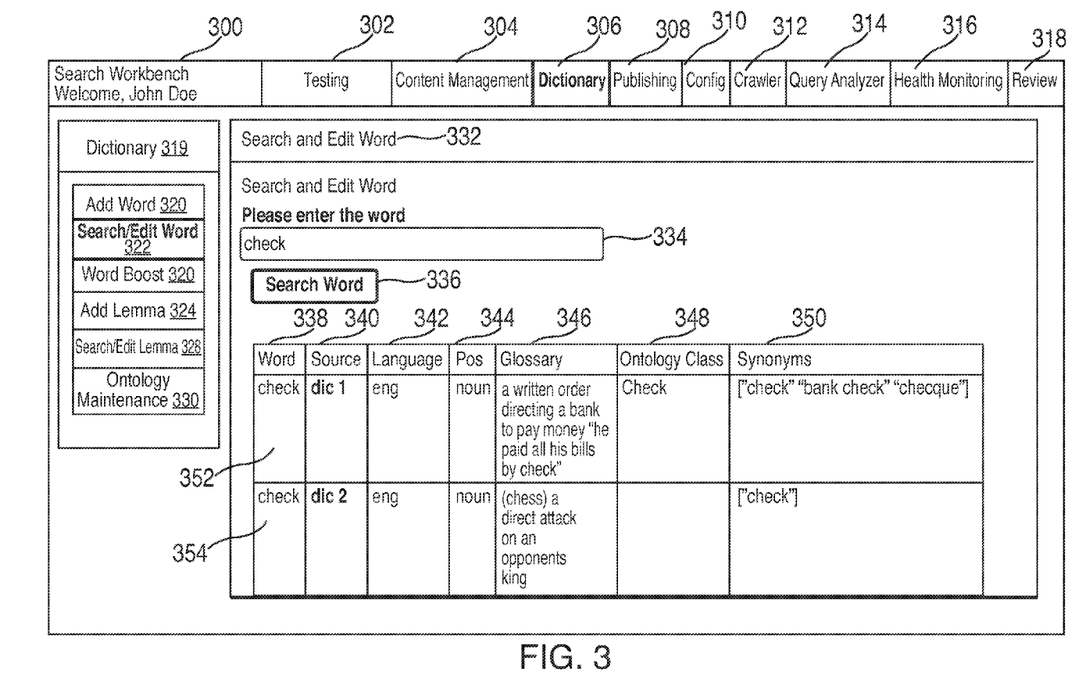
FIG. 3 shows an illustrative GUI in accordance with an embodiment of the invention.

FIG. 3 shows webpage 300. Webpage 300 may include testing tab 302, content management tab 304, dictionary tab 306, publishing tab 308, config. tab 310, crawler tab 312, query analyzer tab 314, health monitoring tab 316, review tab 318 as well as any other suitable tab. Webpage 300 may be open to dictionary tab 306. Search and edit word module 332 may be located on webpage 300. A webpage user may be required to select search/edit word button 322 to open search and edit word module 332.

Dictionary tab 306 may enable a user to modify a dictionary, or modify a predetermined ontology. Dictionary menu 319 includes a list of tasks available to the user. These tasks include add word—320, search/edit word 322, word boost—324, add lemma—326, search/edit lemma—328 and ontology maintenance—330. A lemma may be a word that does not follow the accepted grammatical standard, e.g. octopi vs. octopuses. Lemmatization may be a process of simplifying a word to its base word. The difference between lemmatization and stemming is that lemmatization produces an actual word, while stemming does not always produce an actual word.

Search/edit module 332 includes text entry field 334. Text entry field 334 may accept user input relating to a word. A user may enter a word in order to view the predetermined ontological information related to the word. A user may also want to enter a word in order to edit the predetermined ontological information relating to the word.

Upon entering a word in text entry field 334, a user may select search word button 336. In response to selection of search word button 336, the user may be presented with a table. The table may include column 338—word, column 340—source, column 342—language, column 344—pos (part of speech), column 346—glossary, column 348—ontology class, column 350—synonyms and any other suitable column. The table may also include rows 352 and 354. Rows 352 and 354 may relate to the word "check", which was entered into text entry field 334.

Row 352 may relate to the word check as received from a source called "dic1". Row 352 may show that the language of the word check is English. Row 352 may also show the glossary definition of the word check—"a written order directing a bank to pay money 'he paid all his bills by check'". Row 352 may also show the ontology class of the word check—check. Row 352 may also show synonyms of the word check—check, bank check, cheque or any other suitable synonym.

Row 354 may relate to the word check as received from a source named "dic2". In some instances, the information retrieved from dic2 may be different than the information received from dic1. Row 354 may show that the language of check is English. Row 354 may also show the glossary definition of the word check—"(chess) a direct attack on an opponent's king". Row 354 may show that there is no ontological class associated with the word check. Row 354 may also show synonyms of the word check. In this instance the only available synonym is check, and therefore, there are no synonyms.

Figure 4:
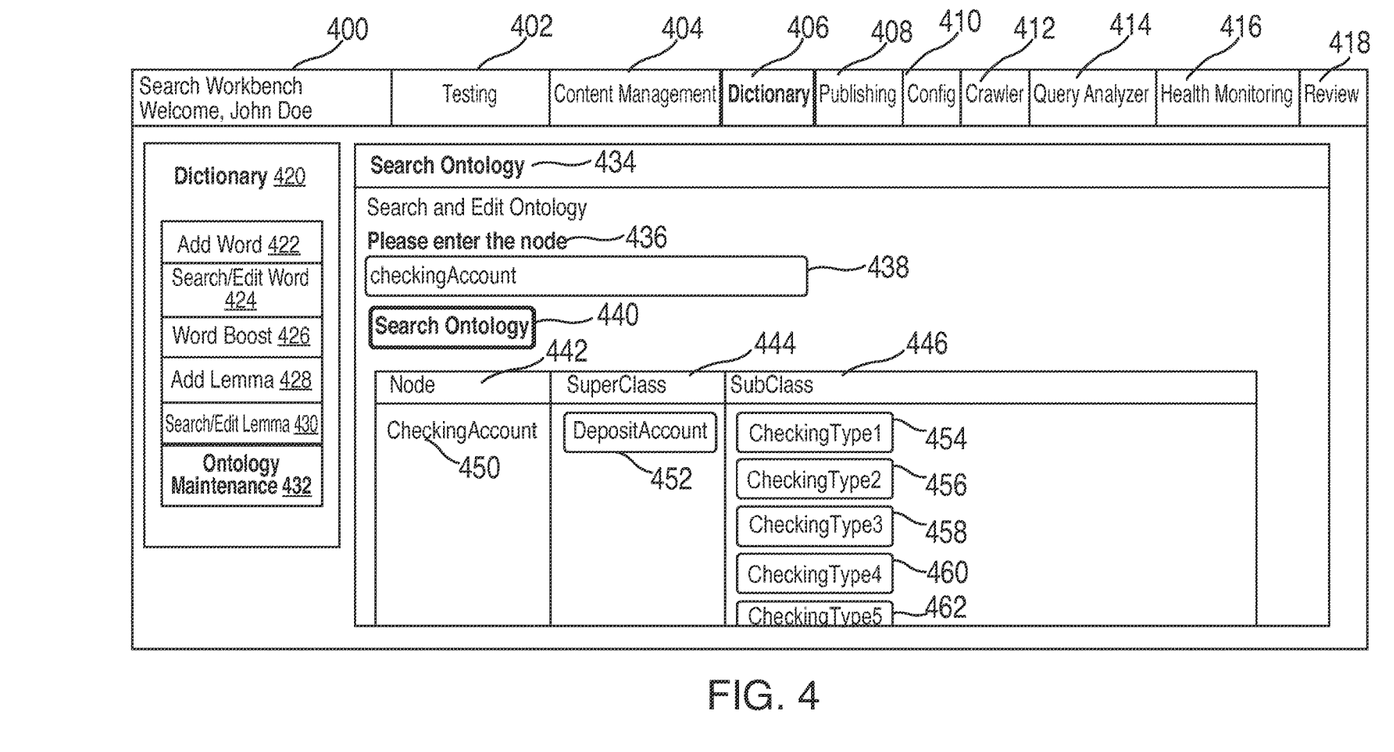
FIG. 4 shows an illustrative GUI in accordance with an embodiment of the invention.

FIG. 4 shows webpage 400. Webpage 400 may include testing tab 402, content management tab 404, dictionary tab 406, publishing tab 408, config. tab 410, crawler tab 412, query analyzer tab 414, health monitoring tab 416, review tab 418 as well as any other suitable tab. Webpage 400 may be open to dictionary tab 406. Search ontology module 434 may be located on webpage 400. A webpage user may be required to select search ontology button 432 to open search ontology module 434.

Dictionary tab 406 may enable a user to modify a dictionary, or modify a predetermined ontology. Dictionary menu 420 includes a list of tasks available to the user. These tasks include add word—422, search/edit word 424, word boost—426, add lemma—428, search/edit lemma—430 and ontology maintenance—432.

A user may be prompted to enter a node, as shown at 436. The user may enter a node, for example, "CheckingAccount", into text entry field 438. A user may then select search ontology button 440 to view the ontological tree of the node "Checking Account". In response to clicking search ontology button 440, a user may be presented with a table. The table may include column 442—node, column 444—superclass, column 446—subclass and any other suitable column. A node may be a child from a superclass node. A node may be a parent to subclass nodes.

CheckingAccount node, as shown at 450, may have a superclass—DepositAccount, as shown at 452. CheckingAccount node may also have subclass nodes CheckingType1 (454), CheckingType2 (456), CheckingType3 (458), CheckingType4 (460) and CheckingType5 (462). The subclass nodes may be examples of a checking account, while a checking account may be an example of a deposit account.

More information regarding nodes has been described in more detail in co-pending, commonly owned application Ser. No. 14/271,571, filed on May 7, 2014, entitled "Method and Apparatus for natural language search for variables", which is hereby incorporated by reference herein in its entirety.

Figure 5:
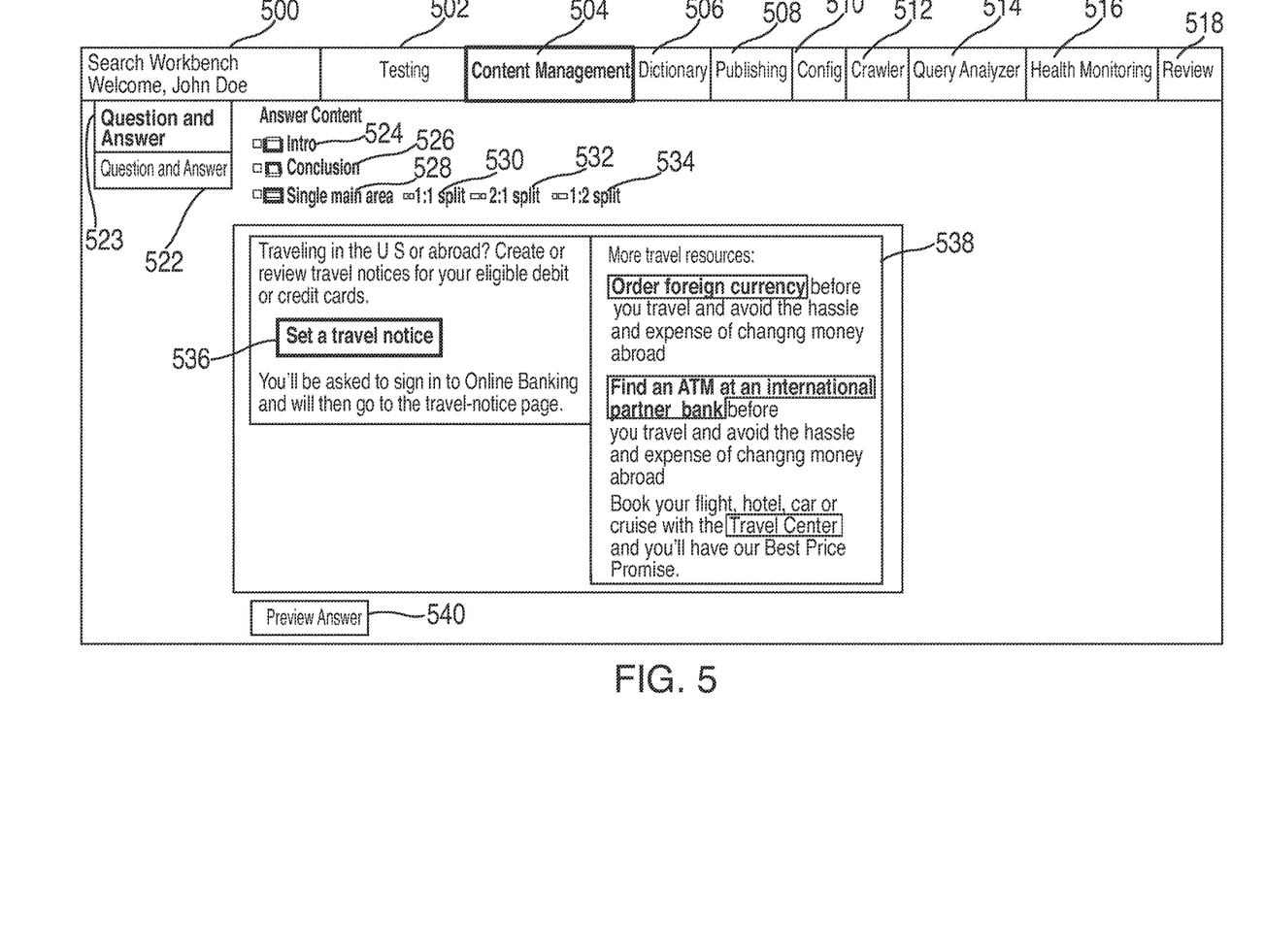
FIG. 5 shows an illustrative GUI in accordance with an embodiment of the invention.

FIG. 5 shows webpage 500. Webpage 500 may include testing tab 502, content management tab 504, dictionary tab 506, publishing tab 508, config. tab 510, crawler tab 512, query analyzer tab 514, health monitoring tab 516, review tab 518 as well as any other suitable tab. Webpage 500 may be open to content management tab 504. An answer content module may be located on webpage 500. Question and answer box 520 shows question and answer button 522. A webpage user may be required to select search question and answer button 522 to open the answer content module.

Answer content module may include radio buttons to select a format for display of the question and answer content. The radio button may include intro display 524 (the display shows the question at the top and a user is required to scroll down to view the remainder of the answer), conclusion display 526 (the display shows the answer and the user is required to scroll up to view the remainder of the question) and single main area display 528 (the question and answer are side by side). Single main area 528 may include subsection radio buttons which enable a user to select a type of side by side view. The sub section radio buttons may include 1:1 display split 530 (the question and answer are included in two equal columns), 2:1 display split 532 (the question is allocated the left ⅔ of the screen and the answer is allocated the right ⅓) and 1:2 display split 534 (the question is allocated the left ⅓ of the screen and the answer is allocated the right ⅔).

In FIG. 5, a user has selected the 2:1 display split, as shown at 532. Therefore, the question is included on the left ⅔ of the screen, as shown at 536, and the answer is included on the right ⅓ of the screen, as shown at 538. A user may preview the answer by clicking preview answer button 540.

Figure 6:
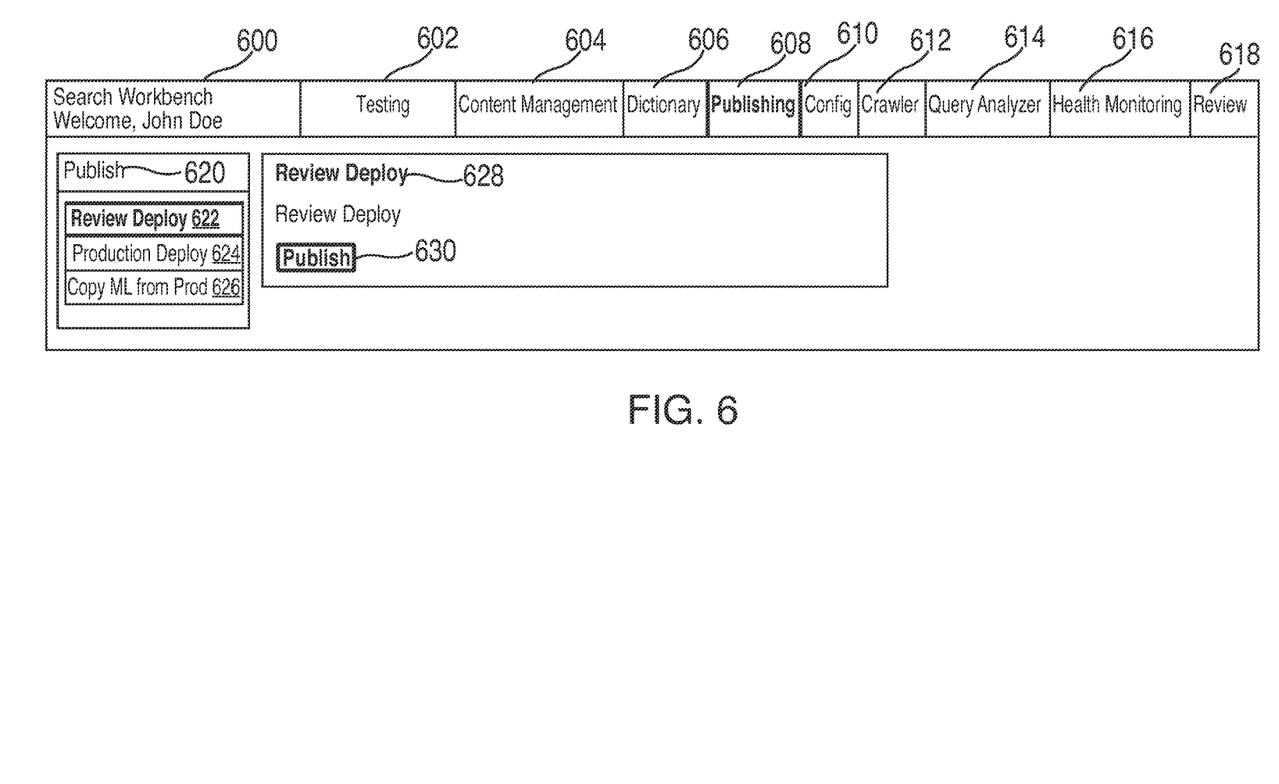
FIG. 6 shows an illustrative GUI in accordance with an embodiment of the invention.

FIG. 6 shows webpage 600. Webpage 600 may include testing tab 602, content management tab 604, dictionary tab 606, publishing tab 608, config. tab 610, crawler tab 612, query analyzer tab 614, health monitoring tab 616, review tab 618 as well as any other suitable tab. Webpage 600 may be open to publishing tab 608.

Publish menu 620 may include publishing options. The publishing options may include review deploy button 622, production deploy 624 and copy ML (master letter) from prod (production) button 626. In response to clicking review deploy button 622, review deploy module 628 may appear on webpage 600. A user may select publish button 630 to publish.

Figure 7:
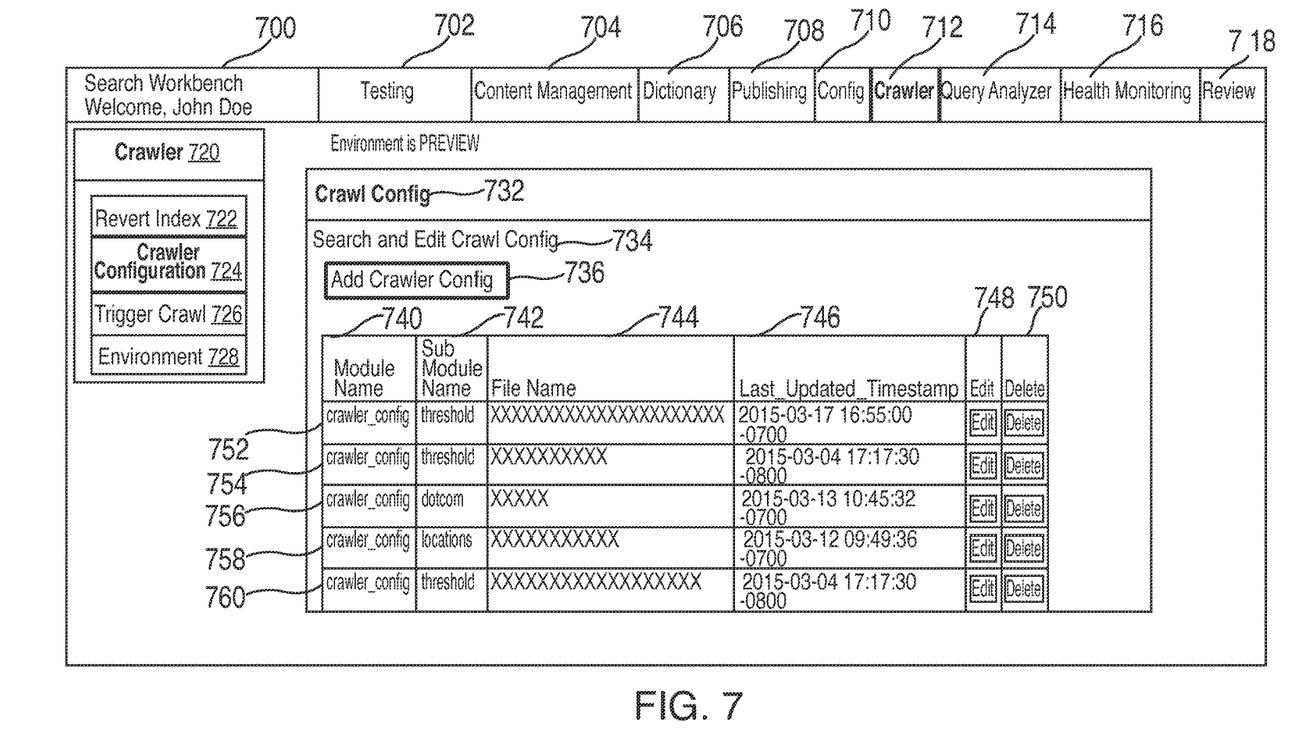
FIG. 7 shows an illustrative GUI in accordance with an embodiment of the invention.

FIG. 7 shows webpage 700. Webpage 700 may include testing tab 702, content management tab 704, dictionary tab 706, publishing tab 708, config. tab 710, crawler tab 712, query analyzer tab 714, health monitoring tab 716, review tab 718 as well as any other suitable tab. Webpage 700 may be open to crawler tab 712.

The functionality of a crawler may include parsing each word of a query. The functionality of a crawler may also include maintaining a URL associated with each webpage. The crawler may also learn how a user corrects his or her query and, utilizing, machine-learning algorithms, auto-correct other users queries.

Crawler menu 720 may include buttons revert index button 722, crawler configuration button 724, trigger crawl button 726 and environment button 728. A user may have chosen crawler configuration button 724. Upon selection of crawler configuration button 724, the system may present the user with crawl config application 732.

Crawl config application 732 may enable a user to search and edit crawl config, as shown at 734. A user may add a crawler config by selecting button 736.

Crawler configurations which may already be present in the system may be shown in a table. The table may include column 740—module name, column 742—submodule name, column 744—file name, column 746—last updated timestamp, column 748—edit and column 750—delete. Rows 752, 754, 756, 758 and 760 each show a crawler configuration module and the attributes associated with the module. For example, Row 740 shows module name "crawler_config" which may be associated with sub module name "threshold" and file name "XXXXXXX" and last updated timestamp "2015-03-17 16:55:00-0700". A user may edit the module by choosing the edit button in column 748. A user may delete the module by choosing the delete button in column 750.

Figure 8:
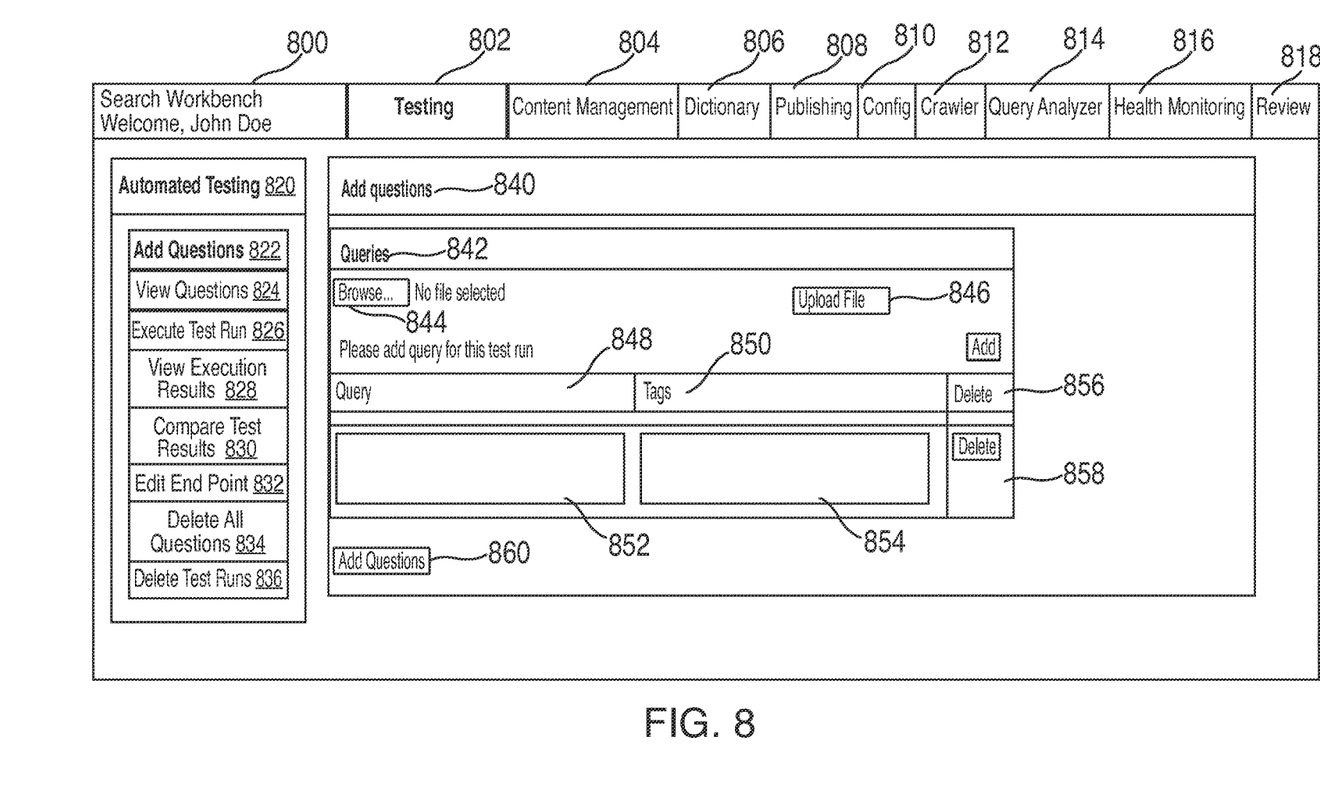
FIG. 8 shows an illustrative GUI in accordance with an embodiment of the invention.

FIG. 8 shows webpage 800. Webpage 800 may include testing tab 602, content management tab 804, dictionary tab 806, publishing tab 808, config. tab 810, crawler tab 812, query analyzer tab 814, health monitoring tab 816, review tab 818 as well as any other suitable tab. Webpage 800 may be open to testing tab 802.

Testing menu 820 may include add questions button 822, which may enable a user to add a query for testing. Testing menu 820 may also include view questions button 824, which may enable a user to view the previously entered query. Testing menu 820 may also include execute test run button 826, which may enable a user to execute a test run of the query. Testing menu 820 may also include view execution results button 828, which may enable a user to view the results of the test. Testing menu 820 may also include compare test results button 830, which may enable a user to compare the results of a plurality of tests. Testing menu 820 may also include edit end point 832, which may enable a user to edit the end point of a query. Testing menu 820 may also include delete all questions button 834, which may enable a user to delete all stored test questions. Testing menu 820 may also include delete test run button 836, which may enable a user to delete all previous test runs.

Add questions module 840 may be opened in response to a user choosing add questions button 822. Add questions module 840 may include queries subheading 842. A user may enter a query by clicking on browse button 844, locating the query file, and clicking upload file button 846 to upload the file. A user may click an add button to add the query to the query list. A user may also upload a query by entering a query into text box 852 under subheading query 848. A user may also enter a tag relating to the query in text box 854 under subheading tags 850. If a user would like to delete a query, the user can delete the query by clicking the delete button shown in box 858, under subheading delete 856. A user may add a question to the list by selecting add questions button 860.

Figure 9:
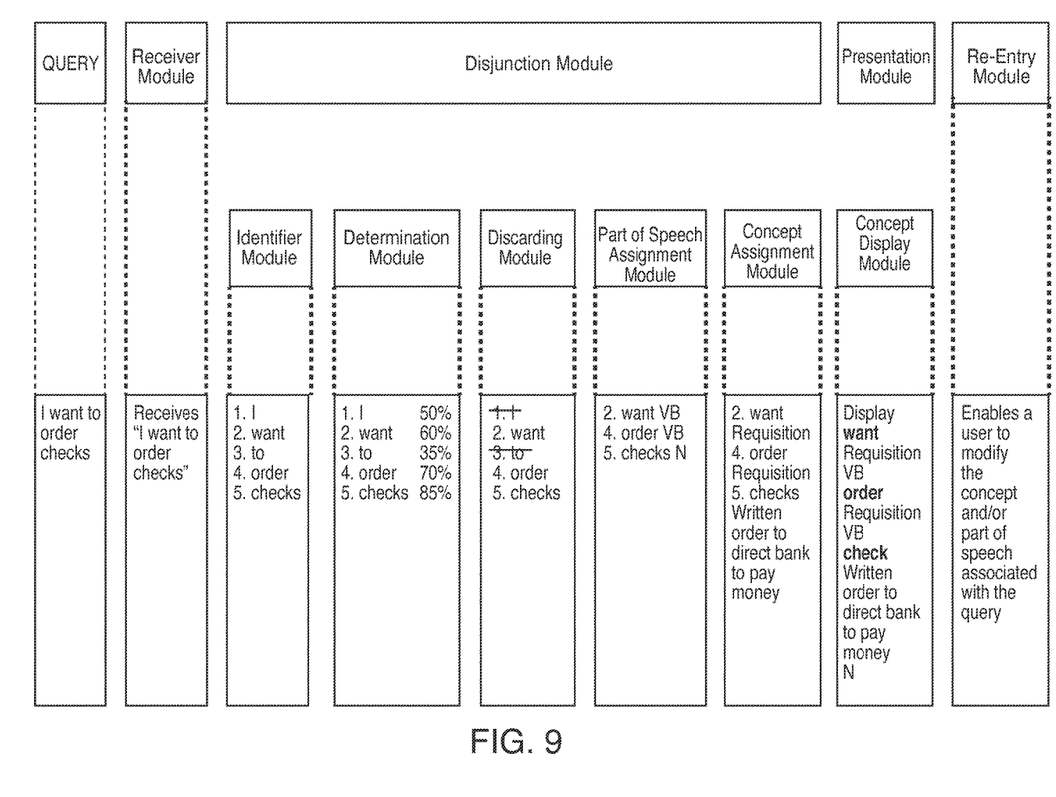
FIG. 9 shows an illustrative flow chart in accordance with the principles of the invention.

FIG. 9 is a flow diagram. The upper half of the diagram shows a process flow according to certain embodiments. The lower half of the diagram shows an exemplary process flow mimicking the process flow steps.

Query 902 ("I want to order checks" (924)) may be received by receiver module 904 (example at 926). Receiver module 904 may transmit query 902 to disjunction module 906. Disjunction module 906 may include identifier module 912, determination module 914, discarding module 916, part of speech assignment module 918, concept assignment module 920 and various other suitable modules. Identifier module 912 may identify each word in the query (example at 928). Determination module 914 may determine a predetermined ontological threshold score for each word (example at 930). Discarding module 916 may discard any word which falls below the predetermined ontological threshold (example at 932). Part of speech assignment module 918 may assign a part of speech to each word based on the context of the query (example at 934). Concept assignment module 920 may assign a concept to each word based on the context of the query (example at 936).

Presentation module 908 may include display module 922. Display module 922 may display each word alongside the associated part of speech and concept (example at 938). Re-entry appliance 910 may enable a user to modify each word, each part of speech and each concept (example at 940).

Thus, methods and apparatus for providing a query analyzer have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. A query analyzer comprising:
   a receiver module that receives a query from a user;
   a disjunction module that separates the components of the query, the disjunction module comprising:
      an identifier module that identifies each word in the query;
      a determination module that assigns to each word an ontological threshold score based on a predetermined ontology;
      a discarding module that discards each word having an assigned ontological threshold score that is below a predetermined ontological threshold;
      a part of speech assignment module that assigns a part of speech to each word having an assigned ontological threshold score that is at or above the predetermined ontological threshold; and
      a concept assignment module that assigns a concept to each word having an assigned ontological threshold score that is at or above the predetermined ontological threshold;
   a presentation module that presents results to the user, the presentation module comprising a display that displays to the user:
      each word having an assigned ontological threshold score that is at or above the predetermined ontological threshold;
      each part of speech for each word having an assigned ontological threshold score that is at or above the predetermined ontological threshold; and
      each concept for each word having an assigned ontological threshold score that is at or above the predetermined ontological threshold; and
   a re-entry appliance that enables the user to modify the query.

2. The query analyzer of claim 1, wherein the re-entry appliance further comprises:
   a first drop-down menu adjacent to the display of each word having an assigned ontological threshold score that is at or above the predetermined threshold, each first drop-down menu comprising a predetermined list of words, said predetermined list of words related to the word to which it is adjacent.

3. The query analyzer of claim 2, wherein the re-entry appliance further comprises:
   a second drop-down menu adjacent to the display of each word having an assigned ontological threshold score that is at or above the predetermined threshold, each second drop-down menu comprising a predetermined list of parts of speech, said predetermined list of parts of speech related to the word to which it is adjacent.

4. The query analyzer of claim 3, wherein the re-entry appliance further comprises:
   a third drop-down menu adjacent to the display of each word having an assigned ontological threshold score that is at or above the predetermined threshold, each third drop-down menu comprising a predetermined list of concepts, said predetermined list of concepts related to the word to which it is adjacent.

5. A method for analyzing queries, the method comprising:
   receiving a query from a user;
   dissecting the query into a plurality of words;
   assigning an ontological threshold score to each of the plurality of words based on a predetermined ontology;
   discarding the words having an assigned ontological threshold score that is below a predetermined ontological threshold;
   for each word having an assigned ontological threshold score that is at or above the predetermined ontological threshold, determining a part of speech associated with the word, said part of speech determination being determined based on the content of the query;
   for each word having an assigned ontological threshold score that is at or above the predetermined ontological threshold, determining a concept associated with the word, said concept determination being determined based on the content of the query;

displaying, to the user, each word having an assigned ontological threshold score that is at or above the predetermined threshold;

for each word having an assigned ontological threshold score that is at or above the predetermined ontological threshold, displaying, adjacent to the word, and along a horizontal axis, the determined part of speech associated with the word, and the determined concept associated with the word; and enabling the user to change:
 each word having an assigned ontological threshold score that is at or above the predetermined threshold;
 each concept; and
 each part of speech.

6. The method of claim 5, wherein the enabling further comprises displaying, in a vertical drop-down menu orthogonal to the horizontal axis, a predetermined list of words relating to each word having an assigned ontological threshold score that is at or above the predetermined threshold.

7. The method of claim 5, wherein the enabling further comprises displaying, in a vertical drop-down menu orthogonal to the horizontal axis, and directly vertically under the part of speech associated with each word, a predetermined list of parts of speech relating to each word having an assigned ontological threshold score that is at or above the predetermined threshold.

8. The method of claim 5, wherein the enabling further comprises displaying, in a vertical drop-down menu orthogonal to the horizontal axis, and directly vertically under the concepts associated with each word, a predetermined list of concepts relating to each word having an assigned ontological threshold score that is at or above the predetermined threshold.

9. The method of claim 5, further comprising enabling the user to re-enter the query in a text entry field.

10. The method of claim 5, wherein the receiving occurs in response to:
 the user typing the query into a text entry field; and
 depressing an analyze query button.

11. The method of claim 5, wherein the receiving occurs in response to the user:
 typing the query into a text entry field;
 receiving query results; and
 depressing an analyze query button.

12. A method for analyzing queries, the method comprising:
 receiving a query from a user;
 determining, based on the user's natural language, a correct grammatical structure for the query;
 dissecting the query into a plurality of words;
 assigning, based on a predetermined ontology and the determined correct grammatical structure, an ontological threshold score to each of the words;
 discarding the words having an assigned ontological threshold score that is below a predetermined ontological threshold;
 for each word having an assigned ontological threshold score that is at or above the predetermined ontological threshold, determining a part of speech associated with the word, said part of speech determination being determined based on the content of the query and the correct grammatical structure;
 for each word having an assigned ontological threshold score that is at or above the predetermined ontological threshold, determining a concept associated with the word, said concept determination being determined based on the content of the query and the correct grammatical structure;
 displaying, to the user, each word having an assigned ontological threshold score that is at or above the predetermined threshold;
 for each word having an assigned ontological threshold score that is at or above the predetermined ontological threshold, displaying, adjacent to the word, and along a horizontal axis defined by the word, the determined part of speech associated with the word, and the determined concept associated with the word; and
 enabling the user to change:
  each word having an assigned ontological threshold score that is at or above the predetermined threshold;
  each concept; and
  each part of speech.

13. The method of claim 12, wherein the enabling further comprises displaying, in a vertical drop-down menu orthogonal to the horizontal axis, a predetermined list of words relating to each word having an assigned ontological threshold score that is at or above the predetermined threshold.

14. The method of claim 12, wherein the enabling further comprises displaying, in a vertical drop-down menu orthogonal to the horizontal axis, and directly vertically under the part of speech associated with each word, a predetermined list of parts of speech relating to each word having an assigned ontological threshold score that is at or above the predetermined threshold.

15. The method of claim 12, wherein the enabling further comprises displaying, in a vertical drop-down menu orthogonal to the horizontal axis, and directly vertically under the concepts associated with each word, a predetermined list of concepts relating to each word having an assigned ontological threshold score that is at or above the predetermined threshold.

16. The method of claim 12, further comprising enabling the user to re-enter the query in a text entry field.

17. The method of claim 12, wherein the receiving occurs in response to:
 the user typing the query into a text entry field; and
 depressing an analyze query button.

18. The method of claim 12, wherein the receiving occurs in response to the user:
 typing the query into a text entry field;
 receiving query results; and
 depressing an analyze query button.

\* \* \* \* \*